US010606748B2

(12) United States Patent
Takahashi

(10) Patent No.: US 10,606,748 B2
(45) Date of Patent: Mar. 31, 2020

(54) APPARATUS AND METHOD FOR GARBAGE COLLECTION ON SOCKET OBJECTS

(71) Applicant: CANON KABUSHIKI KAISHA, Tokyo (JP)

(72) Inventor: Kentaro Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/989,348

(22) Filed: May 25, 2018

(65) Prior Publication Data

US 2018/0349271 A1  Dec. 6, 2018

(30) Foreign Application Priority Data

Jun. 2, 2017 (JP) .................... 2017-110252

(51) Int. Cl.
*G06F 12/02* (2006.01)
*G06F 9/455* (2018.01)

(52) U.S. Cl.
CPC ...... *G06F 12/0253* (2013.01); *G06F 9/45533* (2013.01); *G06F 2212/1044* (2013.01)

(58) Field of Classification Search
CPC .................................................. G06F 12/0253
USPC ......................................................... 711/103
See application file for complete search history.

(56) References Cited

U.S. PATENT DOCUMENTS

| 2004/0098724 | A1* | 5/2004 | Demsey | G06F 12/0253 718/104 |
| 2010/0153675 | A1* | 6/2010 | Kumar | G06F 12/0253 711/170 |
| 2016/0299841 | A1* | 10/2016 | Basu | G06F 12/0269 |
| 2018/0314631 | A1* | 11/2018 | Horie | G06F 12/0269 |

FOREIGN PATENT DOCUMENTS

| JP | 2001134452 A | 5/2001 |
| JP | 2010-244342 A | 10/2010 |
| JP | 2011232919 A | 11/2011 |

OTHER PUBLICATIONS

Tora Marunouchi, "Good and Bad Java Code, Series 10", Nikkei Software, Japan, Nikkei Business Publications, Inc., Mar. 24, 2004, vol. 7, No. 4, p. 128-134.
Japanese Office Action issued in corresponding Japanese Application No. 2017110252 dated Jul. 5, 2019.

* cited by examiner

Primary Examiner — Than Nguyen
(74) Attorney, Agent, or Firm — Venable LLP

(57) ABSTRACT

An upper limit is set on the number of socket objects that can be generated by a virtual machine. If the upper limit is exceeded when a socket object is to be generated, garbage collection is executed. In garbage collection, a socket object is closed, and a resource that has been used by the socket is released.

4 Claims, 14 Drawing Sheets

APPARATUS AND METHOD FOR GARBAGE COLLECTION ON SOCKET OBJECTS

BACKGROUND OF THE INVENTION

Field of the Invention

The present invention relates to an information processing apparatus that executes an application and to a resource management method.

Description of the Related Art

Heretofore, management of resources used by applications running on a device has become important. An example of the resources is memory in which data is placed when a program is running. Another example of the resources is sockets that are used by programs when performing communication. The amount of resources that can be used is finite. Leaving the resource management to a software developer results in an increase in time and effort required for development. Thus, it is common that a platform on which an application runs is entrusted with the resource management. For example, platforms having a mechanism, which is called garbage collection (GC), for managing memory resources are commonly used. Data used by an application is reserved on memory in the form of an object. When the application finishes using the object and no longer references it, the object is no longer needed and is thus deleted through GC. The memory that has been released by deleting the object is available for reuse. GC is involved in management of not only memory but also sockets. To create a socket, a finite amount of resources managed by an OS is needed. A socket is created as an object by acquiring a resource from the OS, and is closed when the communication is finished. When the socket is closed, the resource that the object has acquired from the OS is released and can be reused.

However, there are cases where a closing failure occurs, that is, an object of a socket that is no longer needed is not closed, due to a communication error or the like. A socket that has failed to be closed remains while still occupying the resource. To deal with this situation, when an object of a socket is to be deleted through GC, whether the socket is closed is checked, and if a closing failure is occurring, closing of that socket is executed. During GC, the response of other processes slows down. Therefore, it is an issue to execute GC only when needed. To address this issue, a mechanism (Japanese Patent Laid-Open No. 2010-244342) for executing GC only when a device on which GC is carried out enters an energy-saving state has been devised.

According to Japanese Patent Laid-Open No. 2010-244342, when the device enters the energy-saving state, a slowdown of the response of the device is tolerated, and GC is executed. In this manner, GC is suppressed after recovery from the energy-saving state, and a fast response speed of the device is maintained.

There is a problem in that, if any socket has failed to be closed, GC cannot be said to be sufficiently executed by simply executing GC when the device enters the energy-saving state. A socket is created by acquiring a resource from the OS. If sockets that have failed to be closed are not closed, resources that have been acquired remain acquired, and as a result, the resources of the OS are exhausted. Once this state arises, when a program attempts to create a socket to perform a new communication, a resource cannot be acquired from the OS until the device enters the energy-saving state the next time, consequently, socket creation fails, and thus the new communication cannot be performed.

SUMMARY OF THE INVENTION

The present invention provides an information processing apparatus and a resource management method that can eliminate a resource shortage attributed to a failure to close a socket.

The present invention has the following configuration. According to one aspect of the present invention, there is provided an information processing apparatus that uses a socket object as a communication interface, the information processing apparatus comprising: at least one processor; and at least one memory that stores a program to be executed by the processor, wherein the processor is configured to execute the program and thereby cause the information processing apparatus to function as: a socket management unit that manages the number of generated socket objects of socket objects that have been generated; and a release unit that executes garbage collection if the number of generated socket objects is equal to or larger than a predetermined value, so as to close a socket object that has been generated and thereby release a resource for that socket object.

According to the present invention, a resource shortage attributed to a failure to close a socket can be eliminated.

Further features of the present invention will become apparent from the following description of exemplary embodiments (with reference to the attached drawings).

DESCRIPTION OF THE EMBODIMENTS

Hereinafter, embodiments of the present invention will be described using the drawings.

Embodiment 1

Prior to the description of the present embodiment, a system configuration and a resource management method using a common GC technique will be first described.

Hardware and System Configuration

Figure 1:
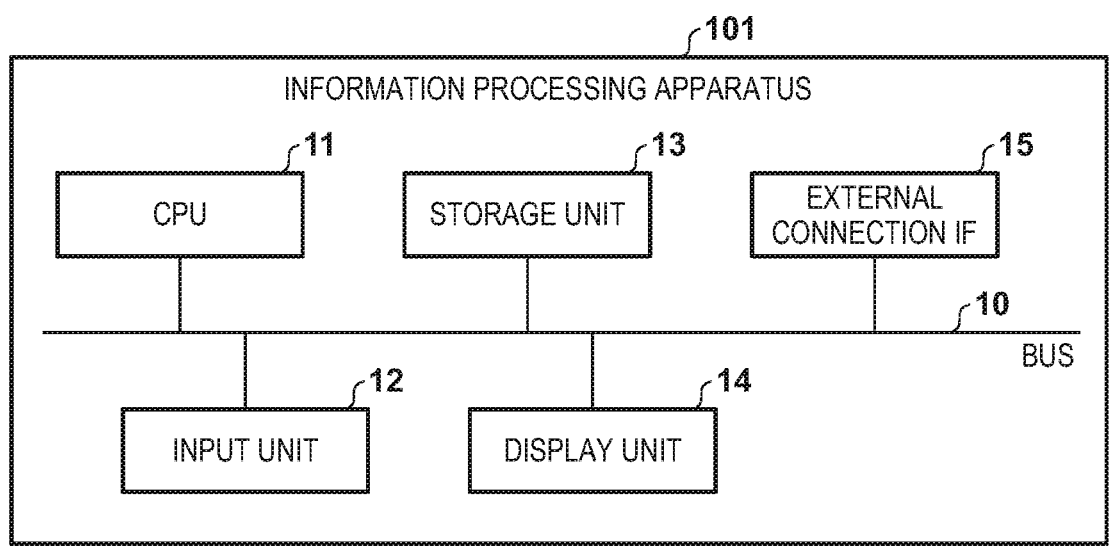
FIG. 1 is a schematic diagram showing an example of a hardware configuration of an information processing apparatus.

FIG. 1 is a diagram showing an example of a hardware configuration of a common information processing apparatus 101. As shown in FIG. 1, with respect to the hardware configuration, the information processing apparatus 101 includes a CPU 11. The CPU 11 performs processing based on programs stored in a storage unit 13 and corresponding to an application, which will be described later, and program execution environments and the like, thereby realizing various functions, or flowcharts, which will be described later. Moreover, an input unit 12, the storage unit 13, a display unit 14, and an external connection IF 15 are connected to the CPU 11 via a bus 10. The input unit 12 is a keyboard and/or a mouse, a touchscreen, or the like for inputting information. The storage unit 13 includes, for example, a ROM, a RAM, a hard disk drive, and the like and stores the above-described programs as well as data and the like for use in processing based on the programs. The display unit 14 is a display on which a screen and the like are displayed. The external connection IF 15 is a network interface or various interfaces for connecting to external devices.

It should be noted that the CPU 11 is capable of functioning as various means by executing the programs. A control circuit, such as an ASIC, that cooperates with the CPU 11 may also function as these means. Moreover, these means may also be realized by cooperation between the CPU 11 and a control circuit that controls the operation of the information processing apparatus 101. The CPU 11 is not necessarily required to be a single CPU 11, and may be constituted by a plurality of CPUs 11. In this case, the plurality of CPUs 11 can execute processing in a distributed manner. Moreover, the plurality of CPUs 11 may be disposed in a single computer or may be disposed in a plurality of physically different computers. It should be noted that a means that is realized by the CPU 11 executing a program may also be realized by a dedicated circuit.

Figure 2:
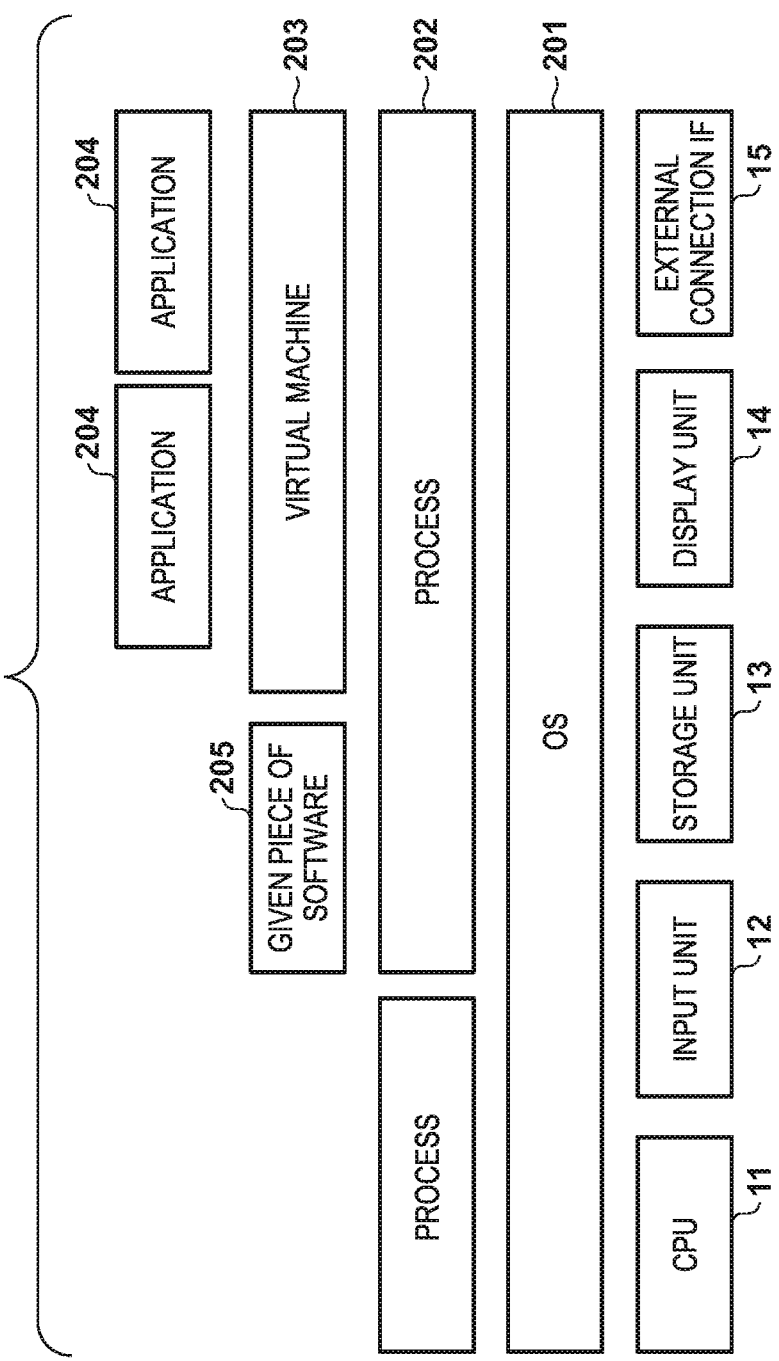
FIG. 2 is a schematic diagram showing an example of a system configuration constructed in the information processing apparatus.

Next, a system configuration constructed in the information processing apparatus 101 will be described using FIG. 2. FIG. 2 is a diagram showing an example of the system configuration of the information processing apparatus 101. An operating system 201 is a piece of software that serves as the base of the entire system. Processes 202 are each a unit of execution when running a piece of software on the operating system 201. Moreover, from the standpoint of resource acquisition, a process is a unit for which a request for a resource is made to the OS, and the resource is allocated, and the amount of resources that can be used by a single process 202 is restricted by the operating system 201. A virtual machine 203 is a piece of software that runs in a process on the operating system 201 and that provides an environment in which an application runs on the virtual machine 203. Applications 204 are applications that run on the virtual machine 203. A plurality of pieces of software can run on a process 202. An advantage of allowing a plurality of pieces of software to run on a single process 202 is that the cost of communication between processes 202 can be saved. In FIG. 2, the virtual machine 203 and a given piece of software 205 run on a single process 202. For example, the virtual machine 203 and the given piece of software 205 have a common process ID and make a request for resources to the OS using that process ID, and the OS can allocate resources to that process ID up to an upper limit.

Moreover, since it is sufficient that the information processing apparatus 101 has hardware such as that shown in FIG. 1 and software and the like shown in FIG. 2, the information processing apparatus 101 may be a computer or may be an image forming apparatus or the like called a multifunction peripheral (MFP). In this case, the information processing apparatus 101 has a scanner, a printer, and the like as the hardware, and includes, as the software, a program for controlling the scanner and the printer and providing the functions thereof to other programs via the operating system 201.

Figure 3:
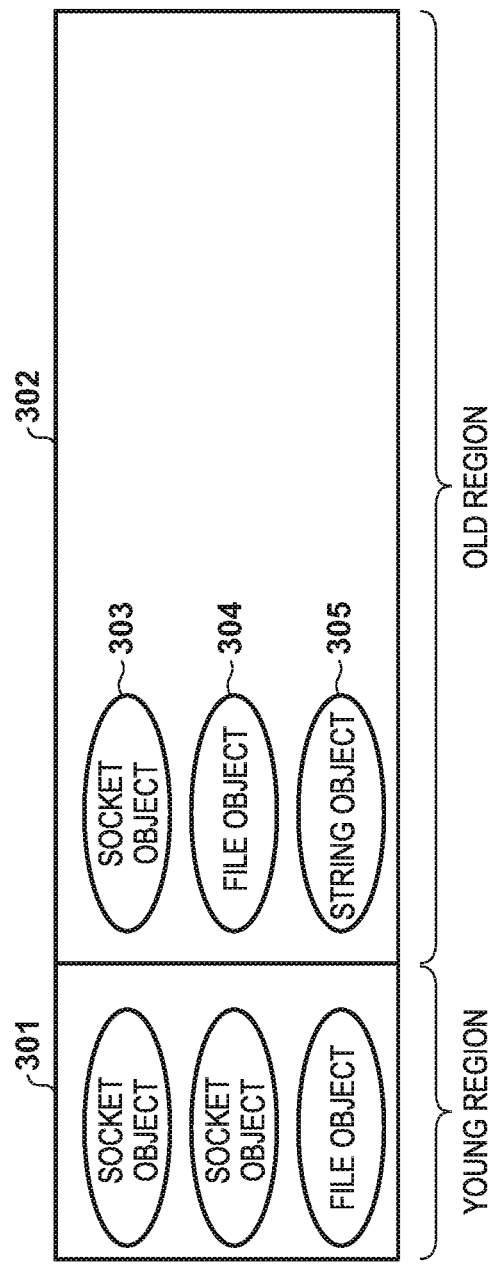
FIG. 3 is a schematic diagram showing memory regions managed by a virtual machine.

Next, the mechanism by which the virtual machine 203 manages memory on the system of the information processing apparatus 101 will be described using FIG. 3. The memory is realized by the RAM and the like of the storage unit 13. However, in the case where the OS 201 provides a virtualization function, resources allocated to processes may be virtual resources, which are virtualized. FIG. 3 is a diagram showing regions of the memory managed by the virtual machine. The mechanism of memory management is called garbage collection (GC). GC deletes an object that is no longer needed, of objects reserved on the memory by programs, so as to release the memory. Examples of the types of objects include socket objects 303, file objects 304, string objects 305, and the like. GC is executed at the time when a shortage of memory for creating a new object occurs.

Although a number of GC schemes have been proposed, generational GC will be described here. Generational GC divides the memory region into a Young region (first memory region) 301 and an Old region (second memory region) 302 and manages these regions. A newly created object is disposed in the Young region 301. The purpose of this is to make use of the property that many objects will become unnecessary shortly after being created. When new objects are disposed in the Young region 301 alone, an object that has become unnecessary shortly after being created can be deleted simply by scanning the Young region 301, so that a delay in GC is suppressed.

GC of the Young region 301 will be referred to as Young GC. An object that has not been deleted even when a plurality of cycles of Young GC have been performed is transferred to the Old region 302. This transfer will be referred to as promotion.

Performing GC on the Old region 302 will be referred to as Full GC. The difference between Young GC and Full GC is not limited only to the target memory region. Young GC and Full GC are also different in the method for scanning the memory region, and Full GC has the property of taking longer processing time than Young GC. GC is realized as, for example, a function of the virtual machine 203, and GC itself consumes resources. Thus, the execution of GC decreases the responsiveness of the other programs. For this reason, in generational GC, only Young GC is executed whenever possible so as to suppress a decrease in responsiveness due to the GC. Thus, in many cases, when GC is executed, only Young GC is executed, and Full GC is not executed.

Figure 4:
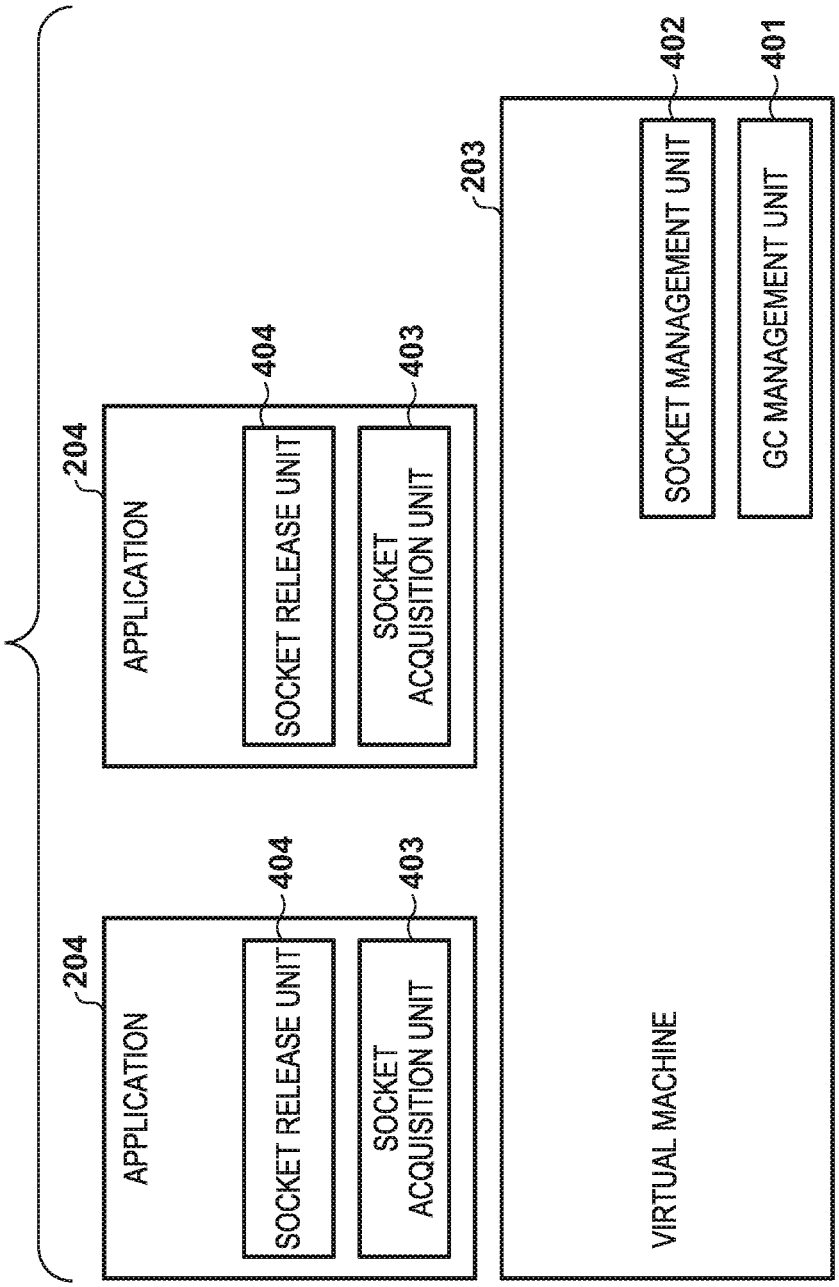
FIG. 4 is a schematic diagram showing a configuration of a resource management function.

Next, a configuration of a resource management function will be described using FIG. 4. FIG. 4 is a diagram showing a configuration of a resource management function. The virtual machine 203 includes a GC management unit 401 that manages the execution of GC. Also, the virtual machine 203 includes a socket management unit 402 that manage socket creation by totaling the number of sockets of the information processing apparatus 101 that are used by the virtual machine 203. Moreover, each application 204 includes a socket acquisition unit 403 that acquires (or creates) a socket from the virtual machine 203 and a socket release unit 404 that releases (or closes) an acquired socket.

The configuration of the information processing apparatus 101 has been described above. The virtual machine 203 that is assumed in the present embodiment is a Java (registered trademark) virtual machine. A constructor or the like of a socket class corresponds to the socket acquisition unit 403. A close method, which is an API of the socket class, corresponds to the socket release unit 404.

Common GC Method

Figure 5:
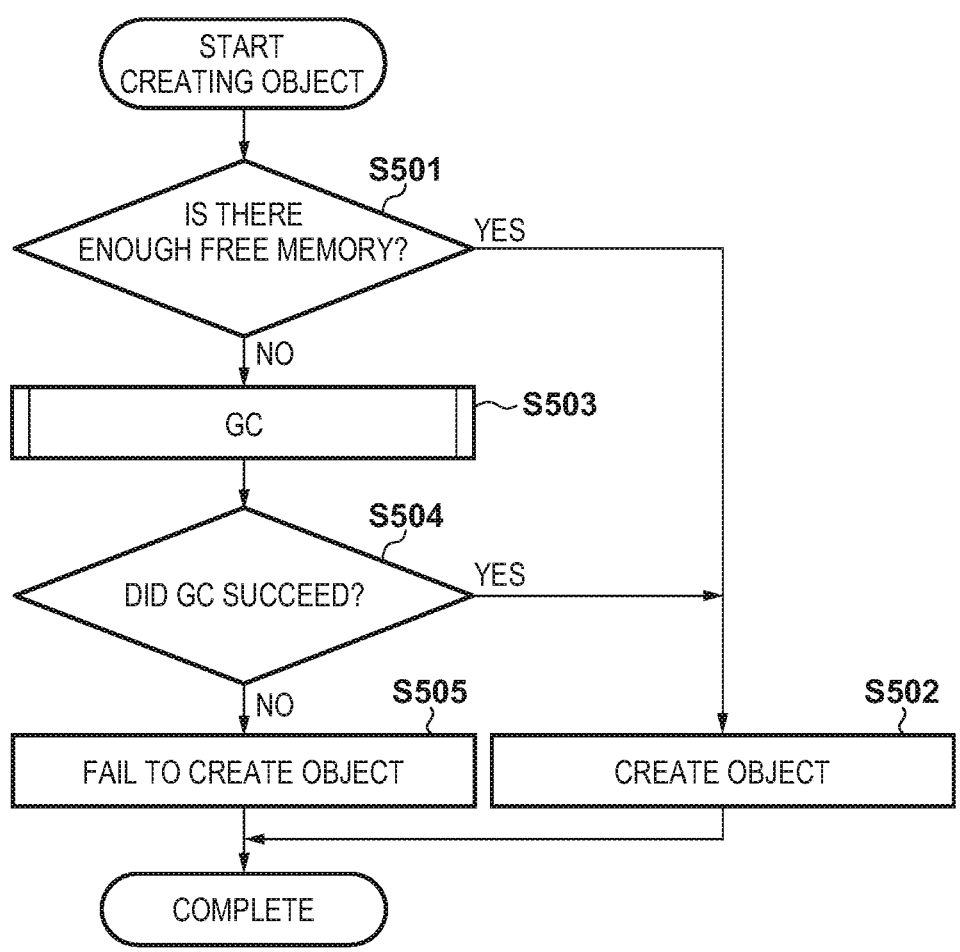
FIG. 5 is a flowchart showing the flow of processing for creating an object on the virtual machine.

Next, the flow of processing for creating an object on the virtual machine 203 will be described using FIG. 5. FIG. 5 is a flowchart showing the flow of processing for creating an object on the virtual machine 203.

When an application 204 or the virtual machine 203 itself starts creating an object, the virtual machine 203 checks (or judges) whether there is enough free memory in which an object can be disposed (step S501). If there is enough free memory, an object is created (step S502). If there is not enough free memory, GC is executed (step S503). Details of step S503 will be described later using FIG. 6.

Then, whether GC succeeded is checked (step S504). If GC succeeded, that is, if free memory was increased, step S502 is executed to create an object. If GC did not succeed, the object creation fails (step S505). If the creation fails, an Error or an Exception occurs on the virtual machine 203.

Figure 6:
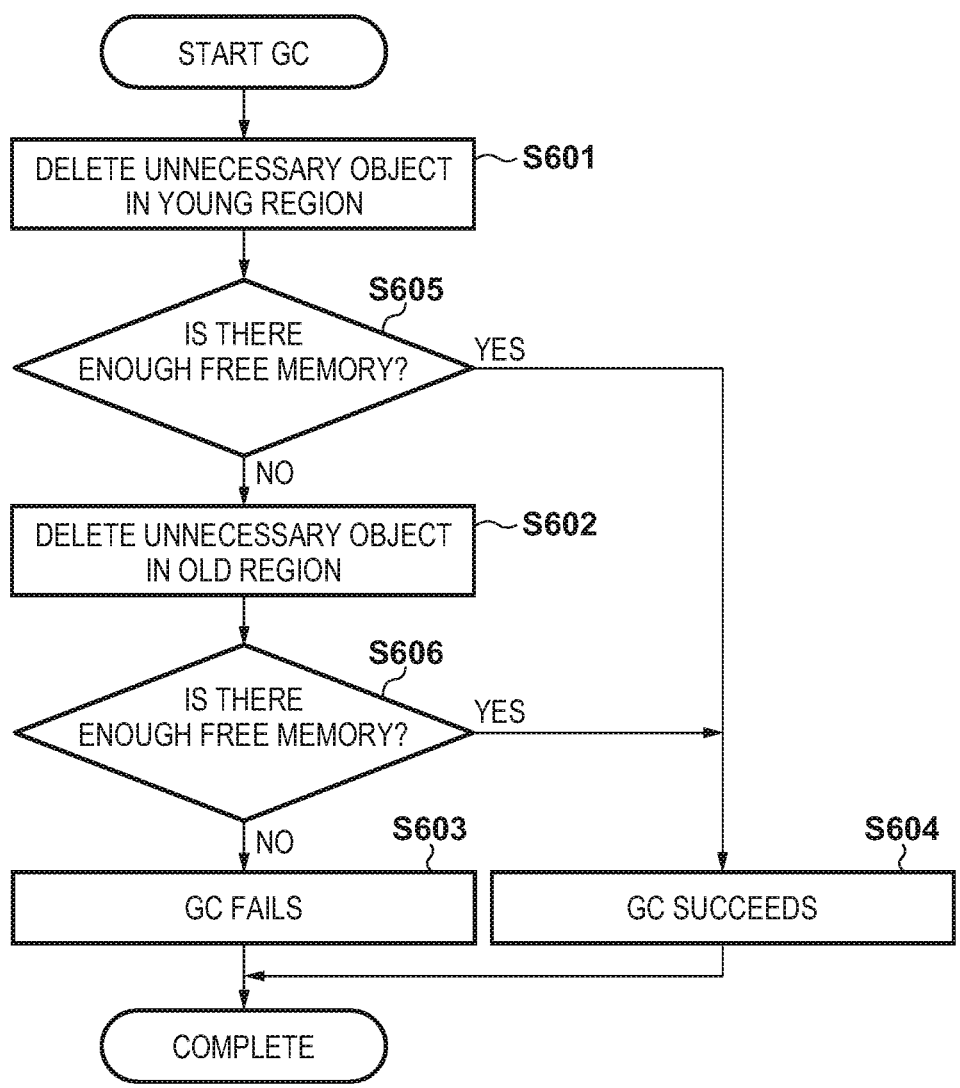
FIG. 6 is a detailed flowchart showing the flow of GC processing by a common virtual machine.

Next, the flow of GC processing by the common virtual machine 203 will be described using FIG. 6. FIG. 6 is a detailed flowchart showing the flow of GC processing by a common virtual machine and corresponds to step S503.

GC is started at step S503 by specifying the size of the object. First, Young GC for deleting an unnecessary object in the Young region 301 is performed (step S601). Then, as in step S501, whether free memory of the specified size was made available through Young GC is checked (step S605).

If such free memory was made available, GC succeeded (step S604). If such free memory was not made available, Full GC for deleting an unnecessary object in the Old region 302 is executed (step S602). Then, as in step S501, whether the free memory was made available is checked (step S606). If the free memory was made available, step S604 is executed, and GC succeeds. If the free memory was not made available, GC fails (step S603).

Figure 7:
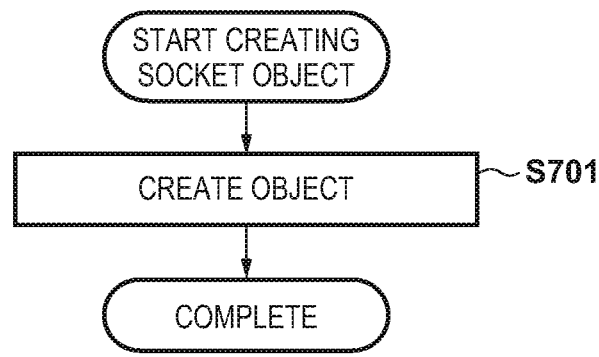
FIG. 7 is a flowchart showing the flow of processing through which the common virtual machine creates a socket.

Next, the flow of processing through which the common virtual machine 203 creates a socket will be described using FIG. 7. FIG. 7 is a flowchart showing the flow of processing through which a common virtual machine creates a socket. The processing in this flowchart corresponds to step S502.

As described above, a socket is a type of object. A socket is created by reserving a resource of the operating system 201. A socket is used for external communication, and should be closed by the close method when the communication is finished. As a result of closing the socket, the resource that is reserved from the operating system 201 is released, and the number of sockets that can be newly created is restored to the previous number.

A socket is created by an application 204 or the virtual machine 203 itself. Object creation is performed in the same manner as in step S502 of FIG. 5 (step S701). Socket creation is performed by the socket management unit 402 creating a socket. In the case where socket creation is requested by the application 204, the socket acquisition unit 403 requests the socket management unit 402 to create a socket.

The created socket is closed when the use thereof is finished. Closing of the socket is executed by the application 204 using the socket release unit 404. Alternatively, closing of the socket is executed from the inside of the virtual machine 203.

However, there are cases where closing of the socket is not explicitly executed due to an unexpected operation of the application 204 or a network error. In such cases, a resource leak occurs, and the number of sockets that can be newly created decreases in an inappropriate manner. Thus, in GC, when an object of a socket is to be deleted, whether the socket is closed is checked, and if the socket has not yet been closed, the socket is closed.

Figure 8:
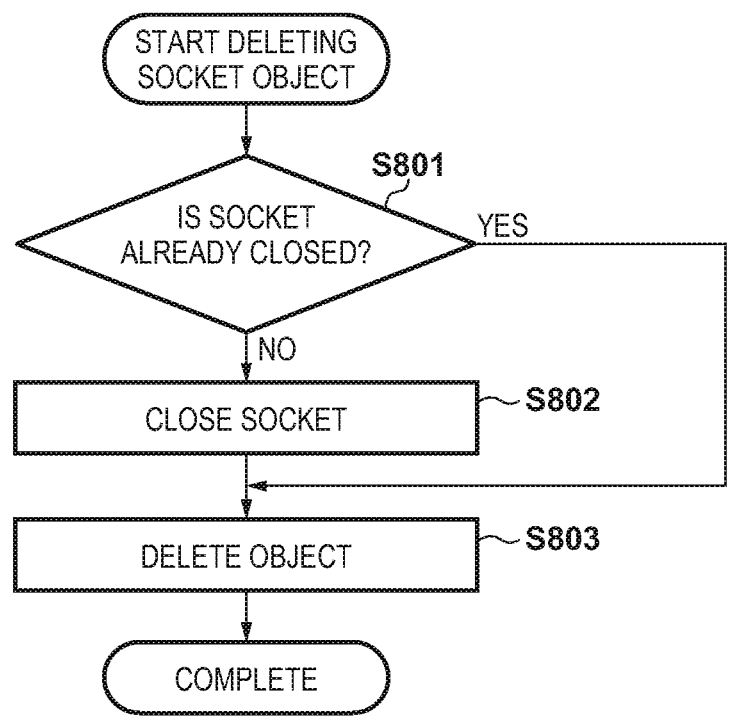
FIG. 8 is a flowchart showing the flow of processing through which the common virtual machine performs GC on a socket.

The flow of processing through which the common virtual machine 203 performs GC on a socket will be described using FIG. 8. FIG. 8 is a detailed flowchart showing the flow of processing through which a common virtual machine performs GC on a socket. The processing of this flowchart is executed in step S601 or S602.

In GC of a socket, first, the GC management unit 401 checks whether a socket of a target of GC has been closed (step S801). If the socket has not yet been closed, the socket is closed (step S802). If it is judged at step S801 that the socket has been closed, or if step S802 is completed, the GC management unit 401 deletes the object of the socket of the target of GC to create free memory (step S803). It should be noted that a target of GC refers to a region on which GC is to be performed through the above-described Young GC or Full GC. The processing in FIG. 8 is executed at the time when a process is suspended or is idle as in a sleep mode, for example, and therefore, sockets in use are not closed.

The mechanism of GC performed by the common virtual machine 203 and the creation and deletion of an object of a socket have been described above.

GC Method According to Present Embodiment

As described above with respect to step S501, GC at step S601 is not executed until a shortage of memory occurs. Thus, when there is a sufficient amount of free memory even though many sockets fail to be closed, GC at step S601 is not executed, nor is the processing in FIG. 8. This leads to a problem in that, before a shortage of memory occurs, resources of the operating system 201 are exhausted, or the upper limit of the amount of resources to be allocated to a single process is exceeded, and socket creation thus fails.

Moreover, the amount resources that can be used by various processes running on the information processing apparatus 101 is finite. When the virtual machine 203 and a given piece of software 205 are operating on a process 202 as shown in FIG. 2, if the virtual machine 203 consumes all of the resources, the piece of software 205 operating on the same process can no longer create a socket, and this may result in malfunctioning.

Thus, it is necessary to adopt a method of setting an upper limit on the number of sockets to be used by software and also closing a socket that has failed to be closed so as to release a resource. With regard to the method of setting an upper limit on the number of sockets, a method is known in which the operating system 201 restricts the amount of resources to be used by a process 202. However, with this method, the amount of resources can be restricted only on a process-by-process basis, and therefore cannot be restricted separately with respect to the virtual machine 203 and the given piece of software 205 operating on the same process 202.

To address this issue, a method of setting an upper limit on the number of sockets to be used by the virtual machine 203 and also releasing a socket that has failed to be closed will be described as Embodiment 1.

Processing Characteristic of Embodiment 1

Figure 9:
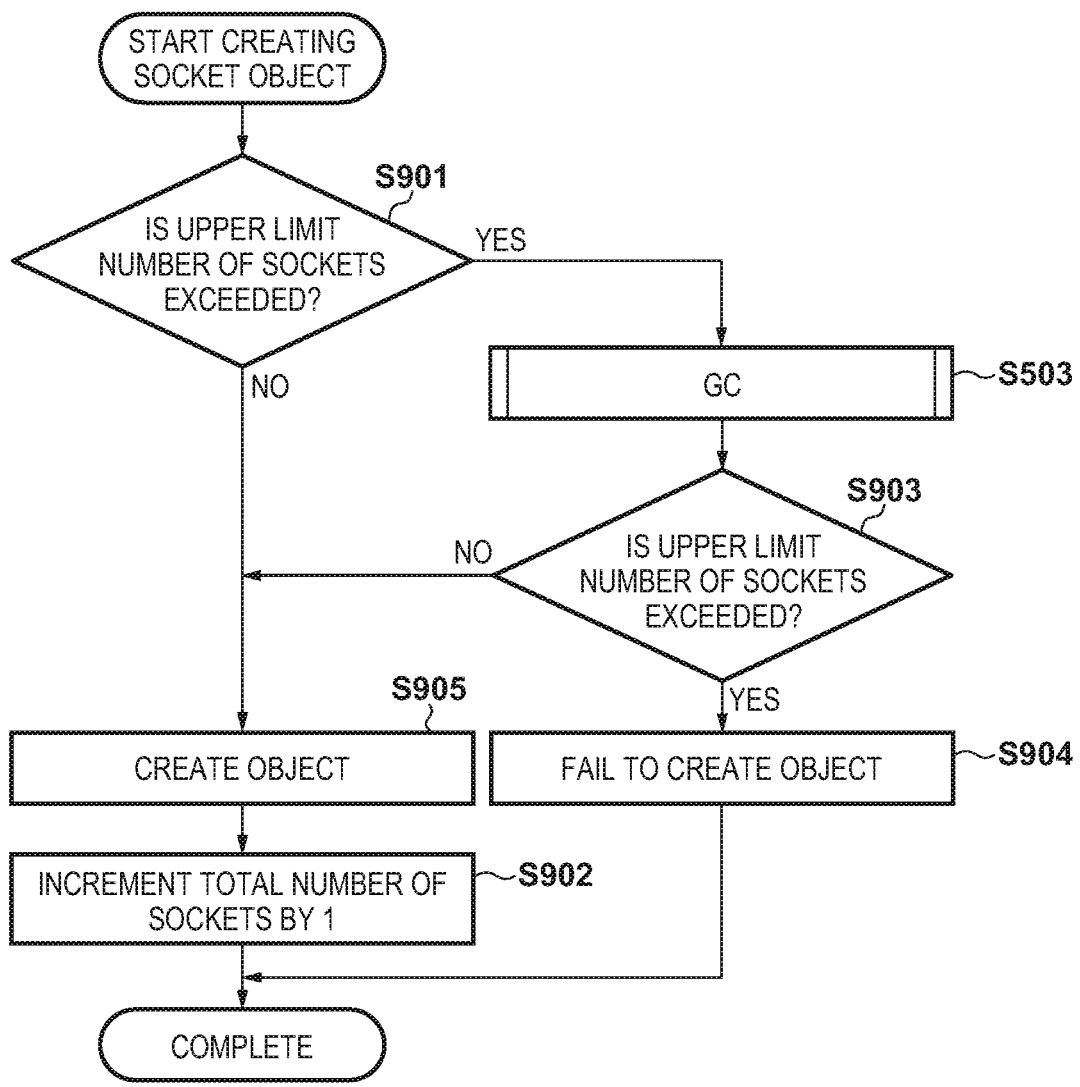
FIG. 9 is a flowchart showing the flow of processing through which a virtual machine according to Embodiment 1 creates a socket.

FIG. 9 is a flowchart showing the flow of processing through which the virtual machine 203 creates a socket. In this processing, the number of sockets to be used by the virtual machine 203 is limited, so as to prevent sockets to be used by any given piece of software 205 operating on the same process as the virtual machine 203 from being affected. In the present embodiment, the processing in FIG. 9 is executed instead of the processing in FIG. 7.

In generating a socket, whether the number of sockets that have been generated exceeds an upper limit number (i.e., upper limit value or threshold value) of sockets for the virtual machine 203 is checked before a socket is generated (step S901). The upper limit number of sockets is set in the socket management unit 402. Moreover, the current number of sockets, which indicates the number of sockets that are currently generated, is also stored in the socket management unit 402. If it is judged that the upper limit number of sockets is not exceeded, a socket object is created in the same manner as in step S701 (step S905). Then, the socket management unit 402 increments the total number of sockets (i.e., the current number of sockets) by 1 (step S902).

Figure 10:
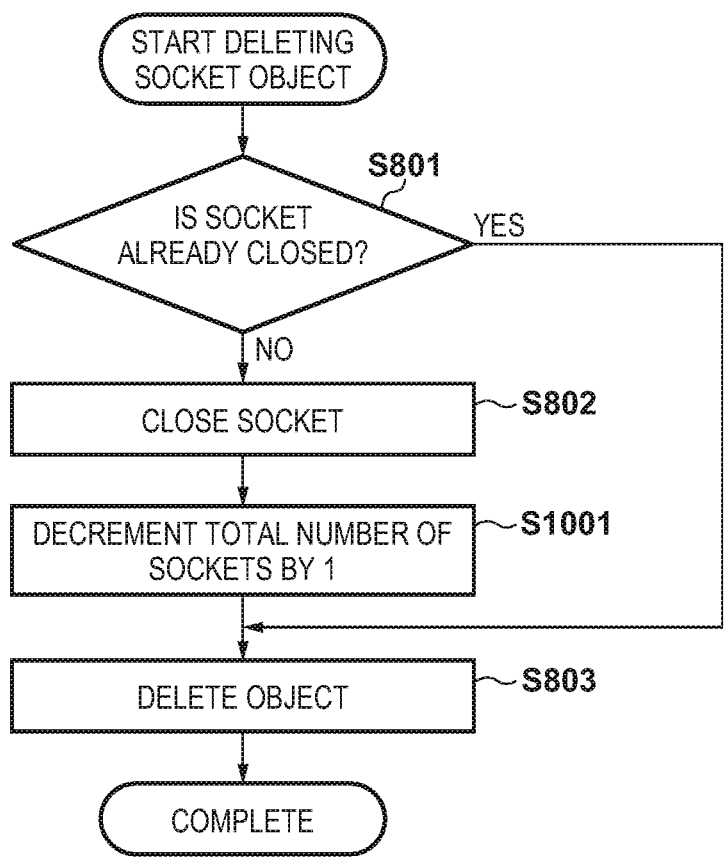
FIG. 10 is a flowchart showing the flow of processing through which the virtual machine according to Embodiment 1 performs GC on a socket.

At step S901, if it is judged that the upper limit number is exceeded, the GC management unit 401 executes GC in the same manner as in step S503. However, at step S601 or S602 of the processing in FIG. 6, which is executed at step S503, the processing shown in FIG. 10 is executed instead of the processing in FIG. 8. FIG. 10 will be described later. Then, after the execution of GC, whether the number of sockets that are currently generated exceeds the upper limit number is checked as in step S901 (step S903).

If the upper limit number is not exceeded at step S903, steps S701 and S902 are executed. If the upper limit number is exceeded at step S903, the creation of a socket object fails as in step S505 (step S904).

Next, GC of a socket will be described using FIG. 10. FIG. 10 is a flowchart showing the flow of processing through which the virtual machine 203 performs GC on a socket, and this processing is executed instead of the processing in FIG. 8.

When GC of a socket is started, whether a socket has been closed is checked as in step S801. If the socket has been closed, the object of that socket is deleted as in step S803.

If the socket has not yet been closed, the socket is closed as in step S802. Then, the total number of sockets (i.e., the current number of sockets) is decremented by 1 (step S1001). The object is deleted as in step S803. It should be noted that in the case where a plurality of sockets are present in the target region, the processing in FIG. 10 may be applied to each of those sockets. In this manner, all of the unnecessary (i.e., leaked) sockets can be released from the target region at steps S601 and S602.

It should be noted that although whether the number of sockets that have been generated exceeds an upper limit value (predetermined value) is judged at steps S901 and S903, whether the number of sockets that have been generated is equal to or larger than the upper limit value (predetermined value) may be judged at these steps.

In the foregoing description, the method of setting an upper limit on the number of sockets to be used by the virtual machine 203 so that sockets to be used by any given piece of software 205 operating on the same process as the virtual machine 203 are prevented from being affected has been described. Furthermore, the method of releasing a socket resource that has failed to be closed if the upper limit number is exceeded has been described.

Thus, even when a failure to close a socket occurs on the virtual machine 203, if it is judged that a shortage of resources occurs when a socket is to be created, GC is executed to close the socket that has failed to be closed, thereby restoring the resources, so that a new socket can be created.

Embodiment 2

Figure 11:
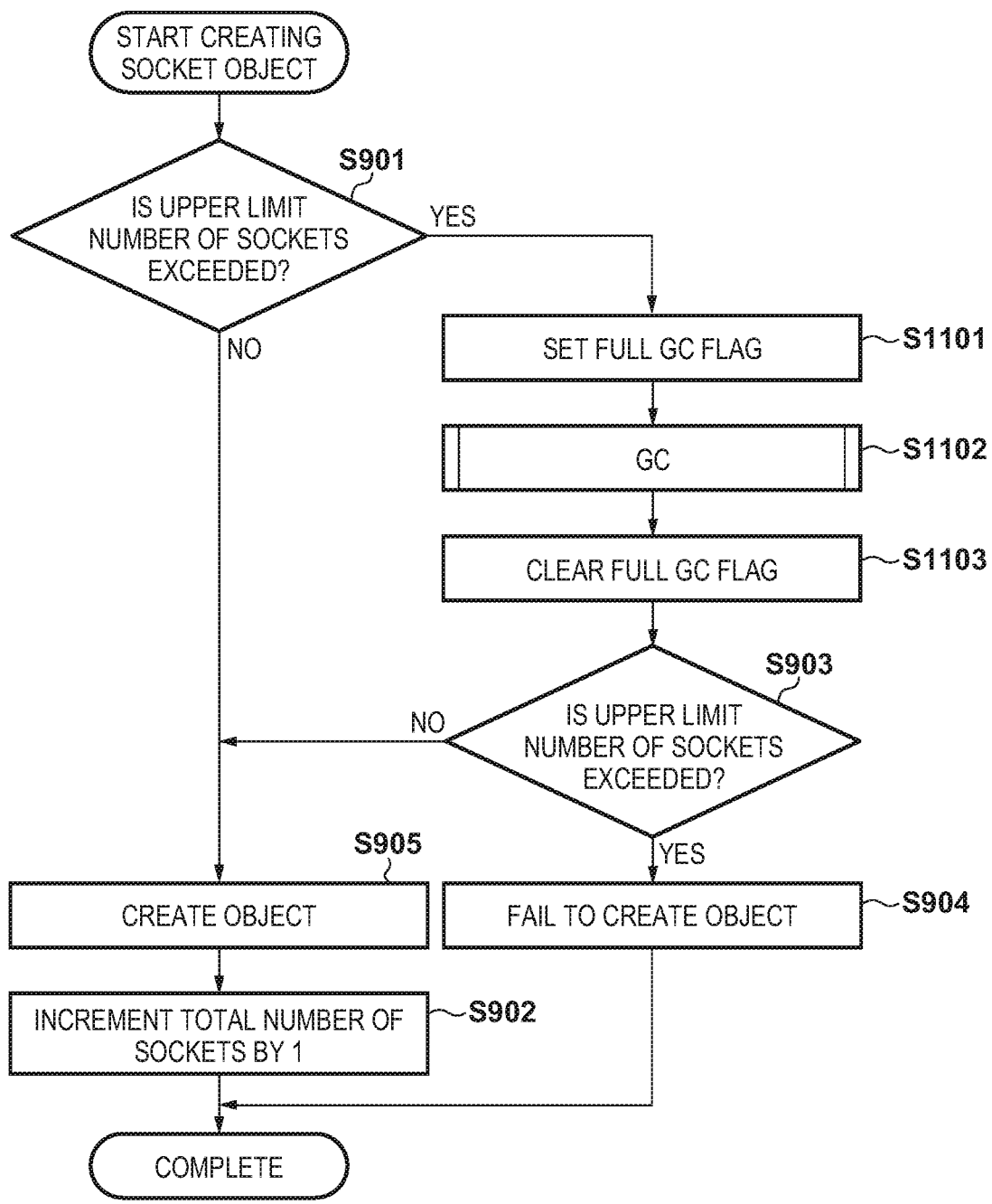
FIG. 11 is a flowchart showing the flow of processing through which a virtual machine according to Embodiment 2 creates a socket.

With regard to GC that is executed when the number of sockets has reached an upper limit, it is preferable to execute Full GC in order to release all of the sockets that have failed to be closed. This method will be described using FIG. 11. FIG. 11 is a flowchart showing the flow of processing through which a virtual machine creates a socket.

When socket creation is started, whether the upper limit number of sockets is exceeded is checked as in step S901. If the upper limit number of sockets is not exceeded, a socket is created and the total number is updated as in steps S905 and S902.

If the upper limit number is exceeded at step S901, a Full GC flag, which is a flag referenced by GC, is set (step S1101). Then, GC that references the Full GC flag is executed (step S1102). Details of GC that references the Full GC flag will be described later using FIG. 12. When the execution of GC is finished, the Full GC flag is cleared (step S1103).

Then, whether the upper limit number is exceeded is checked as in step S903. If the upper limit number is not exceeded, steps S905 and S902 are executed to complete the creation. If the upper limit number is exceeded, the creation fails as in step S904.

Figure 12:
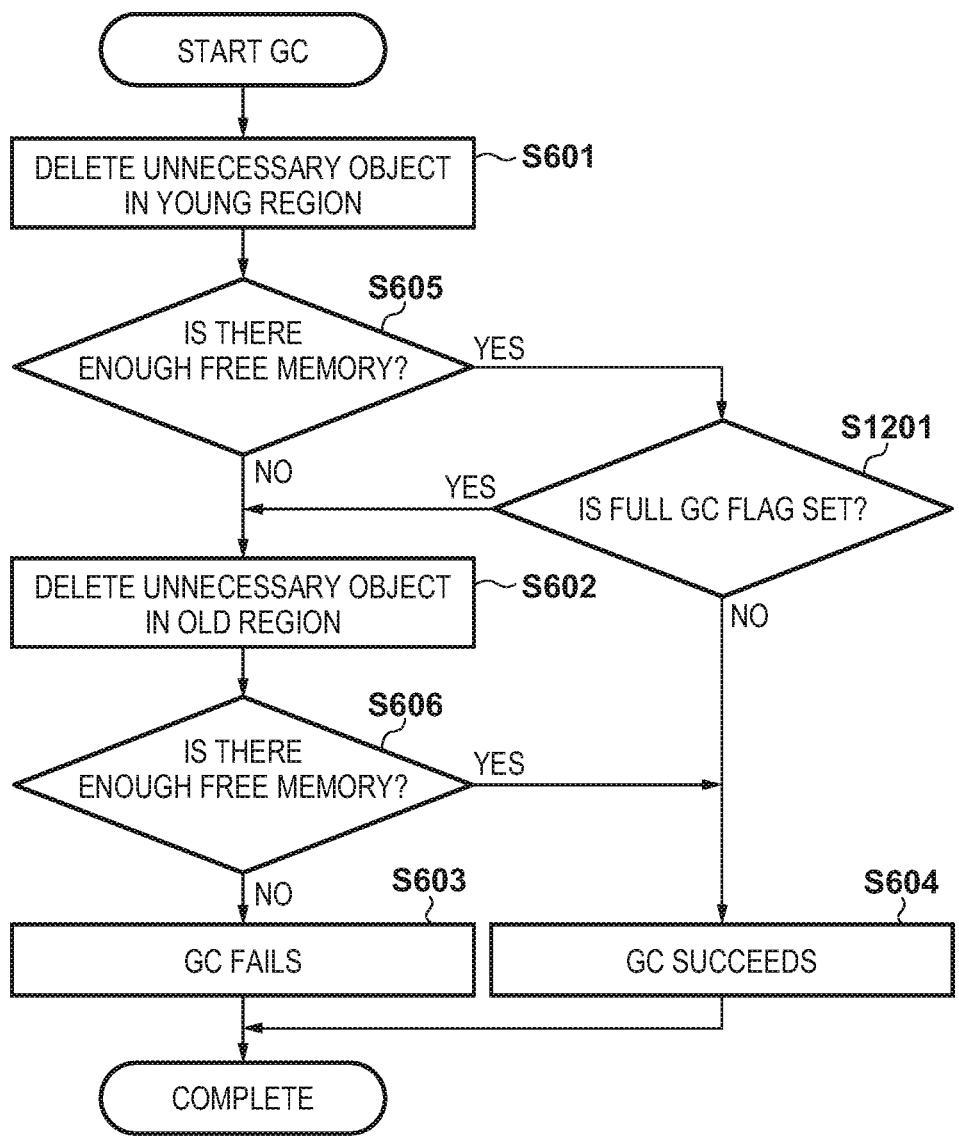
FIG. 12 is a detailed flowchart showing the flow of GC processing by the virtual machine according to Embodiment 2.

Next, details of GC that references the Full GC flag will be described using FIG. 12. FIG. 12 is a detailed flowchart showing the flow of GC processing at step S1102.

When GC is started, Young GC is executed as in step S601. Here, the processing in FIG. 10, for example, is executed with respect to all of the unreleased sockets. Then, whether there is enough free memory is checked as in step S605. If there is not enough free memory, Full GC is executed as in step S602. In this case as well, the processing in FIG. 10, for example, is executed with respect to all of the unreleased sockets. Then, whether there is enough free memory is checked as in step S606, and if there is not enough free memory, GC fails as in step S603. If there is enough free memory, GC succeeds as in step S604.

If there is enough free memory at step S605, whether a Full GC flag is set is checked (step S1201). If the Full GC flag is set, step S602 and the following steps are executed. If the Full GC flag is not set, step S604 and the following steps are executed.

In the foregoing description, the method for executing Full GC during GC when the number of sockets has reached an upper limit and thereby releasing all of the sockets that have failed to be closed has been described as Embodiment 2.

This embodiment has a pronounced effect when a device is operated in a high-load environment. In a high-load environment, a large number of new objects that will soon become unnecessary are created in the Young region 301, and GC is frequently executed at intervals of several seconds. In this environment, an object of a socket that has been used for communication for several seconds or more is promoted and transferred to the Old region 302 in a short time. With a common GC technique, even when the promoted socket fails to be closed and becomes unnecessary as it is, the socket that has failed to be closed in the Old region 302 is not closed, because no matter how many times GC is repeated, GC is executed only in the Young region 301. Then, the upper limit number of sockets is easily exceeded, and a new socket can no longer be created. At this time, applying the present embodiment so as to include the Old region in the target of GC makes it possible to perform GC on the socket that has failed to be closed in the Old region 302, thereby enabling the creation of a new socket. Assuming that any objects in the Young region will be transferred to the Old region sooner or later, the target region may be limited to only one region, for example, the Old region, of the two regions.

It should be noted that, in the present embodiment, an upper limit is set on the number of sockets to be used by the virtual machine 203; however, setting an upper limit on sockets is not limited to the environment of the present embodiment. Even if an upper limit is not set with respect to the virtual machine 203, there is an upper limit on the number of sockets that can be created by a process 202, and therefore, a similar problem arises in the case where a device is operated in a high-load environment. According to the present embodiment, even in such cases, it is possible to eliminate a shortage of resources by releasing a socket.

Embodiment 3

Figure 13:
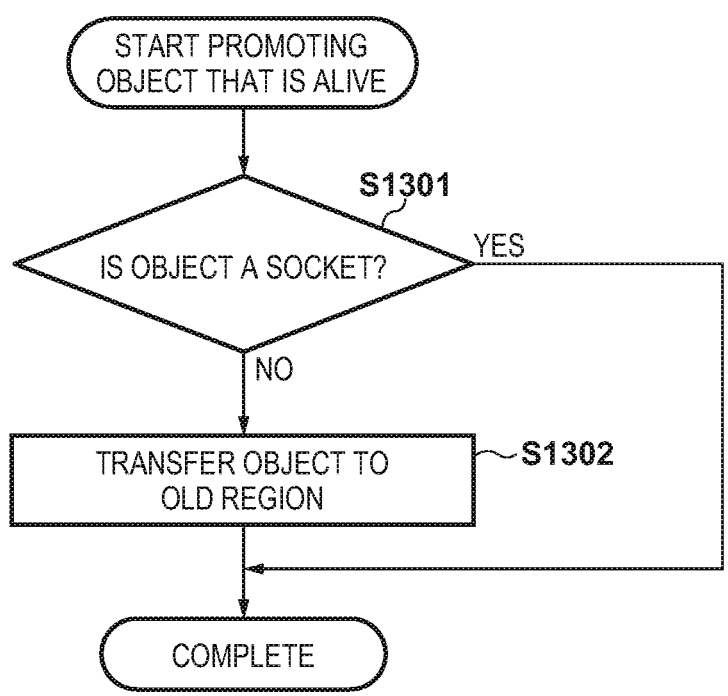
FIG. 13 is a flowchart showing the flow of promotion processing according to Embodiment 3.

Full GC places a high load and thus causes a decrease in the responsiveness of a device during execution. For this reason, in order to alleviate the load, a method of performing GC on all the socket objects by executing only Young GC is preferable. This method will be described using FIG. 13. FIG. 13 is a flowchart showing the flow of promotion processing during GC.

When promotion is started during GC, the GC management unit 401 checks whether the object to be promoted is a socket (step S1301). If the object to be promoted is a socket, the processing is completed without promoting that object. On the other hand, if the object to be promoted is not a socket, this object is transferred to the Old region 302 (step S1302). The processing in FIG. 13 is applied to each object that is located in the Young region and that may be a target of promotion.

Thus, a socket object continues to remain in the Young region 301, and therefore, any socket that has failed to be closed can be released by simply executing Young GC.

In the foregoing description, the method for reliably performing GC on a socket object by executing only Young GC has been described. When it is necessary to close a socket that has failed to be closed, only Young GC is executed, and thus, a decrease in the responsiveness of the device can be suppressed.

Embodiment 4

In Embodiment 3, the method of performing GC on all the socket objects by executing only Young GC has been described. However, if Full GC is executed even though socket leaks can be eliminated by executing only Young GC, the responsiveness of the device decreases. For this reason, when GC is executed in order to release a socket, it is preferable that Full GC is not executed.

However, a common GC technique is implemented such that Young GC and Full GC cannot be separately executed. Thus, a method for switching the operation of GC by referencing a flag is necessary. This method will be described as Embodiment 4.

Figure 14:
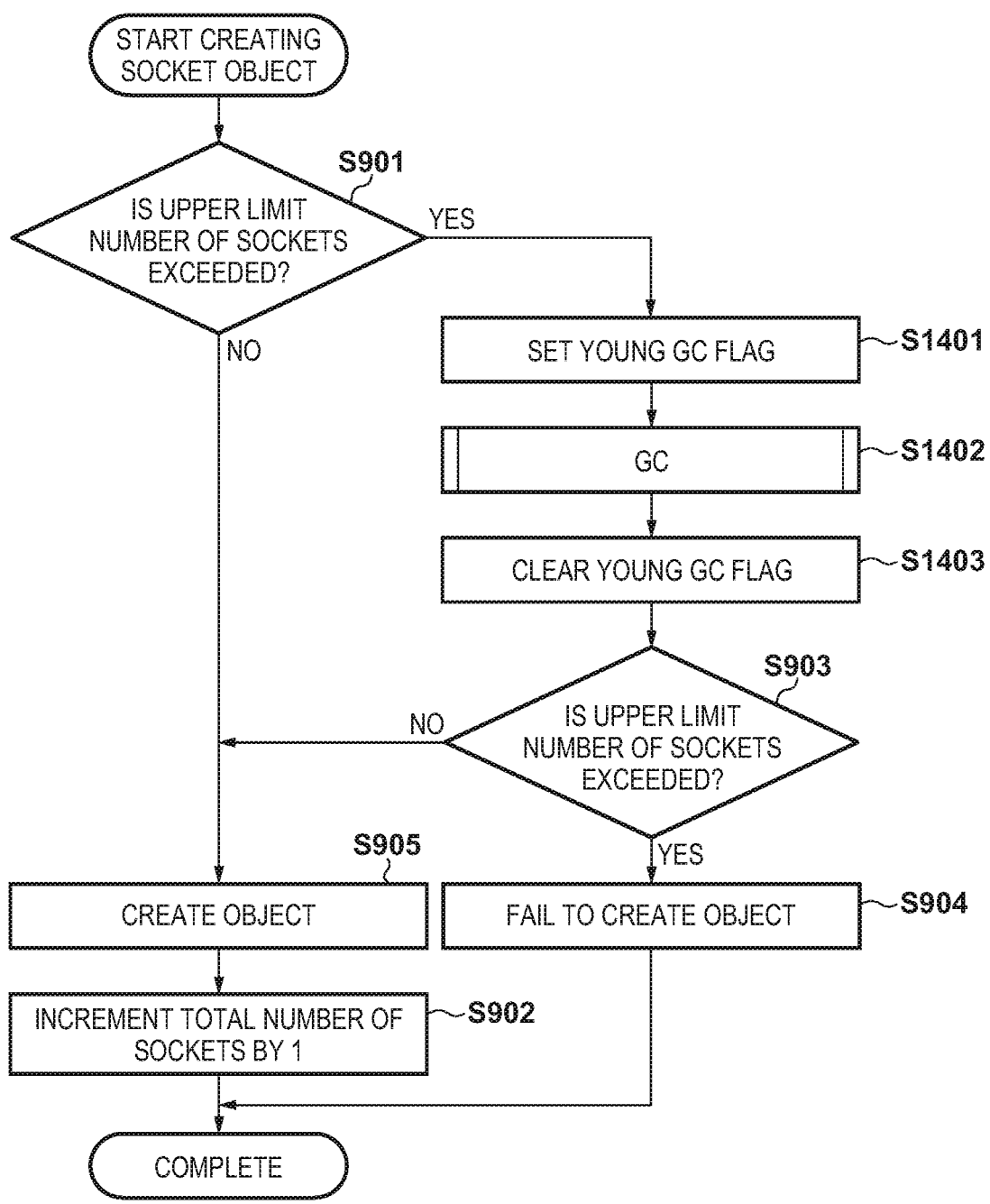
FIG. 14 is a flowchart showing the flow of processing through which a virtual machine according to Embodiment 4 creates a socket.

First, the flow of socket creation will be described using FIG. 14. FIG. 14 is a flowchart showing the flow of processing through which a virtual machine creates a socket.

When socket creation is started, whether the upper limit number is exceeded is checked as in step S901. If the upper limit number is not exceeded, a socket is created and the total number is updated as in steps S905 and S902.

If the upper limit number is exceeded, a Young GC flag is set (step S1401). Then, GC that references the Young GC flag is executed (step S1402). When the execution is finished, the Young GC flag is cleared (step S1403).

Then, the number of sockets is checked as in step S903. If the upper limit of the number of sockets is exceeded, the creation fails as in step S904. If the upper limit is not exceeded, a socket is created and the total number is updated as in steps S905 and S902.

Figure 15:
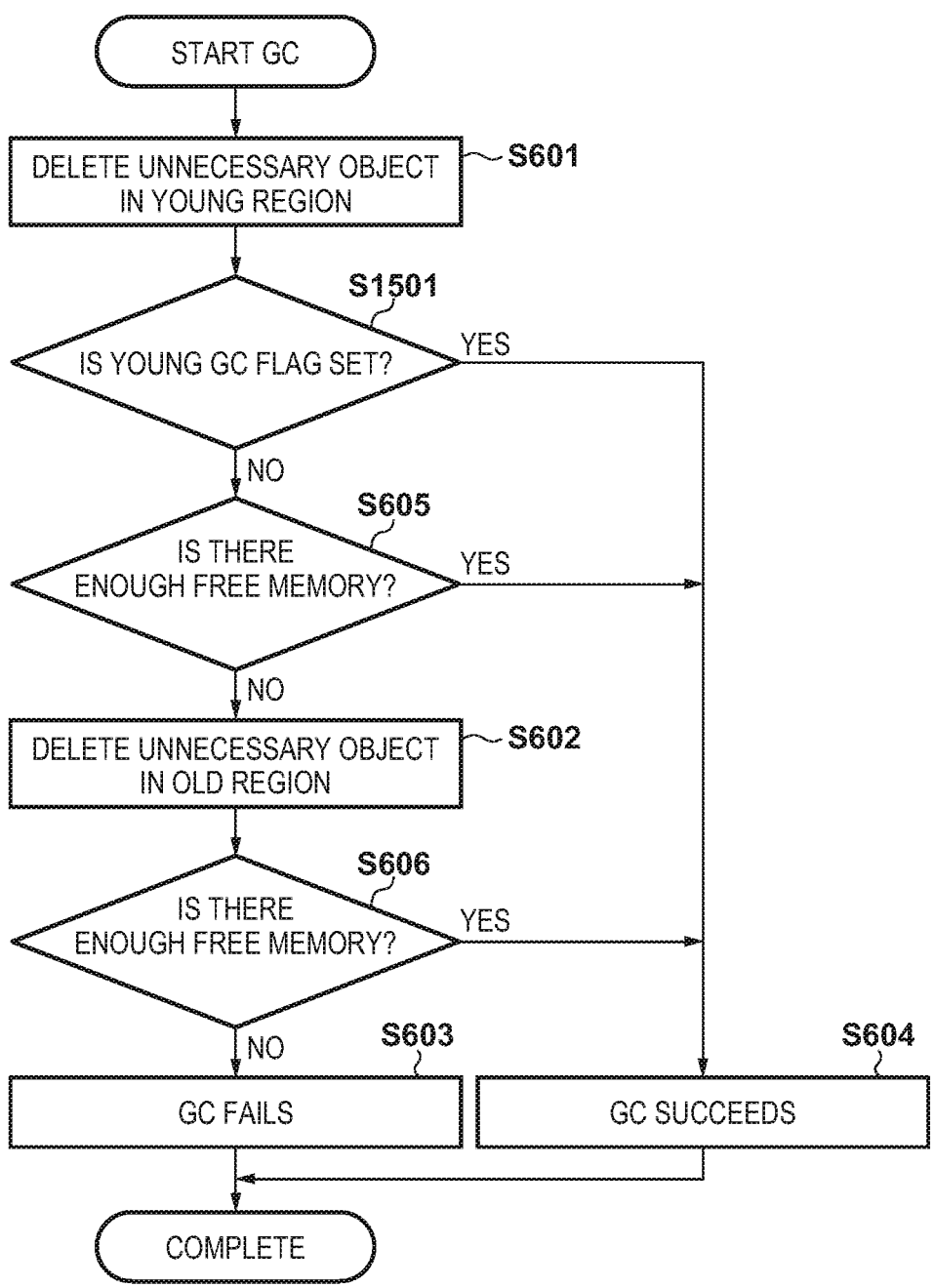
FIG. 15 is a detailed flowchart showing the flow of GC processing by the virtual machine according to Embodiment 4.

Next, the method of GC that references a Young GC flag will be described using FIG. 15. FIG. 15 is a detailed flowchart showing the flow of GC processing corresponding to step S1402.

When GC is started, Young GC is executed as in step S601. Then, whether a Young GC flag is set is checked (step S1501). If the flag is set, GC succeeds as in step S604. If the flag is not set, whether there is enough free memory is checked as in step S605.

If there is enough free memory, GC succeeds as in step S604. If there is not enough free memory, Full GC is executed as in step S602. Then, whether there is enough free memory is checked as in step S606, and if there is not enough free memory, GC fails as in step S603. If there is enough free memory, GC succeeds as in step S604.

In the foregoing description, the method for executing only Young GC during GC when the number of sockets has reached an upper limit and thereby preventing a decrease in the responsiveness of a device has been described as Embodiment 4. When it is necessary to close a socket that has failed to be closed, the execution of Full GC is prevented, and a decrease in the responsiveness of the device can be suppressed accordingly.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-110252, filed Jun. 2, 2017 which is hereby incorporated by reference herein in its entirety.

What is claimed is:

1. An information processing apparatus that uses a socket object as a communication interface, the information processing apparatus comprising:
    at least one processor; and
    at least one memory that stores a program to be executed by the processor and that has a first memory region and a second memory region,
    wherein the processor is configured to execute the program and thereby cause the information processing apparatus to function as:
        a promote unit that transfer generated objects from the first memory region to the second memory region;
        a socket management unit that manages the number of generated socket objects of socket objects that have been generated; and
        a release unit that executes garbage collection if the number of generated socket objects is equal to or larger than a predetermined value, so as to close a socket object that has been generated and thereby release a resource for that socket object,
    wherein the release unit performs the garbage collection for the first memory region when the number of generated socket objects exceeds the predetermined value, and then performs the garbage collection for the second memory region regardless of whether or not there is free memory after performing the garbage collection for the first memory region.

2. The information processing apparatus according to claim 1,
    wherein the socket management unit and the release unit are included in a virtual machine that is executed by the information processing apparatus, and
    the socket object is generated for an application that is executed on the virtual machine.

3. A resource management method to be performed by an information processing apparatus that uses a socket object as a communication interface and that has at least one memory including a first memory region and a second memory region, the method comprising:
    transferring generated objects from the first memory region to the second memory region;
    managing the number of generated socket objects of socket objects that have been generated; and
    executing garbage collection if the number of generated socket objects is equal to or larger than a predetermined value, so as to close a socket object that has been generated and thereby release a resource for that socket object,
    wherein the garbage collection for the first memory region is performed when the number of generated socket objects exceeds the predetermined value, and then the garbage collection for the second memory region is performed regardless of whether or not there is free memory after performing the garbage collection for the first memory region.

4. A non-transitory computer-readable medium storing a program configured to cause a computer to execute an information processing method, the computer using a socket object as a communication interface and having at least one memory including a first memory region and a second memory region, the method comprising:
    a promote step of transferring generated objects from the first memory region to the second memory region;
    a socket management step of managing the number of generated socket objects of socket objects that have been generated; and
    a release step of executing garbage collection if the number of generated socket objects is equal to or larger than a predetermined value, so as to close a socket object that has been generated and thereby release a resource for that socket object,
    wherein the garbage collection for the first memory region is performed when the number of generated socket objects exceeds the predetermined value, and then the garbage collection for the second memory region is performed regardless of whether or not there is free memory after performing the garbage collection for the first memory region.

* * * * *